(12) United States Patent
Nomura et al.

(10) Patent No.: US 7,466,389 B2
(45) Date of Patent: Dec. 16, 2008

(54) DISPLAY DEVICE HAVING CONTACT HOLES' TAPER ANGLE LARGER IN DISPLAY REGION THAN IN TERMINAL REGION

(75) Inventors: Hideshi Nomura, Togane (JP); Yasuko Gotoh, Mobara (JP); Toshiki Kaneko, Chiba (JP); Kenta Kamoshida, Chiba (JP)

(73) Assignee: Hitachi Displays Co., Ltd., Mobara-shi ( * ) Notice: Subject to any disclaimer, the term of this patent is extended or adjusted under 35 U.S.C. 154(b) by 543 days.

(21) Appl. No.: 11/054,315

(22) Filed: Feb. 10, 2005

(65) Prior Publication Data

US 2005/0179849 A1    Aug. 18, 2005

(30) Foreign Application Priority Data

Feb. 18, 2004    (JP)    ............... 2004-041190

(51) Int. Cl.
  *G02F 1/1345*    (2006.01)
  *G02F 1/1333*    (2006.01)
(52) U.S. Cl. ............... 349/152; 349/138; 349/149; 349/151
(58) Field of Classification Search ............ 349/122, 349/138, 149–152
  See application file for complete search history.

(56) References Cited

U.S. PATENT DOCUMENTS

2002/0101556 A1* 8/2002 Kikkawa et al. ............. 349/138
2004/0183989 A1* 9/2004 Kim et al. ................... 349/155

FOREIGN PATENT DOCUMENTS

JP    2000-171817    6/2000
JP    2000260872 A *  9/2000

OTHER PUBLICATIONS

Machine translation of JP 2000-260872.*

* cited by examiner

*Primary Examiner*—Andrew Schechter
(74) *Attorney, Agent, or Firm*—Antonelli, Terry, Stout & Kraus, LLP.

(57) ABSTRACT

A display device is provided with a first contact hole formed in a display region and a second contact hole formed in a terminal region, and a first insulating layer and a second insulating layer formed in that order. The taper angle of the first insulating layer at the first contact hole is larger than the taper angle of the first insulating layer at the second contact hole, and the taper angle of the second insulating layer at the first contact hole is larger than the taper angle of the second insulating layer around the second contact hole.

21 Claims, 9 Drawing Sheets

| STEP | PLAN VIEW | SECTION VIEW |
|---|---|---|
| (a) OPAS Forming |  |  |
| (b) Half Light Exposure |  |  |
| (c) OPAS Etching |  |  |
| (d) PAS Etching |  |  |
| (e) ITO Forming |  |  |

| STEP | PLAN VIEW | SECTION VIEW |
|---|---|---|
| (a) OPAS Forming |  |  |
| (b) Half Light Exposure |  |  |
| (c) OPAS Etching |  |  |
| (d) PAS Etching |  |  |
| (e) ITO Forming |  |  |

| STEP | PLAN VIEW | SECTION VIEW |
|---|---|---|
| (a) OPAS Forming |  |  |
| (b) Half Light Exposure |  |  |
| (c) OPAS Etching |  |  |
| (d) PAS Etching |  |  |
| (e) ITO Forming |  |  |

| STEP | PLAN VIEW | SECTION VIEW |
|---|---|---|
| (a) OPAS Forming |  |  |
| (b) Half Light Exposure |  |  |
| (c) OPAS Etching |  |  |
| (d) PAS Etching |  |  |
| (e) ITO Forming |  |  |

| STEP | PLAN VIEW | SECTION VIEW |
|---|---|---|
| (a) OPAS Forming |  |  |
| (b) Half Light Exposure |  |  |
| (c) OPAS Etching |  |  |
| (d) PAS Etching |  |  |
| (e) ITO Forming |  |  |
| (f) OPAS Ashing |  |  |

| STEP | PLAN VIEW | SECTION VIEW |
|---|---|---|
| (a) OPAS Forming |  |  |
| (b) Half Light Exposure |  |  |
| (c) OPAS Etching |  |  |
| (d) PAS Etching |  |  |
| (e) ITO Forming |  |  |
| (f) OPAS Ashing |  |  |

DISPLAY DEVICE HAVING CONTACT HOLES' TAPER ANGLE LARGER IN DISPLAY REGION THAN IN TERMINAL REGION

BACKGROUND OF THE INVENTION

The present invention relates to a display device, for example, a liquid crystal display device.

A typical liquid crystal display device is configured such that, on one surface of a substrate thereof, a plurality of signal lines are juxtaposed in the longitudinal direction as well as in the lateral direction, and respective pixels are driven in response to signals supplied to these signal lines. The respective pixels are arranged in a matrix array, and a liquid crystal display part is constituted by these pixels. Liquid crystal is sandwiched between one substrate and another substrate such that the liquid crystal is disposed at positions which correspond to the pixels.

The signal lines extend to regions outside the liquid crystal display part and are provided with terminals at the extended ends thereof. These terminals are made to face down, and they constitute portions which are connected with bumps of a semiconductor device on which the liquid crystal display part is mounted. The signals are supplied to the signal lines from the semiconductor device.

Here, in a typical case, the signal lines are covered with an insulation film inside of a region of the liquid crystal display part, and the insulation film is formed such that it extends to the outside of the liquid crystal display part. Accordingly, the terminals are formed by exposing portions of the signal lines by forming holes in the insulation film and by stacking, for example, conductive layers, which exhibit the strong resistance against electrolytic corrosion, on these exposed portions.

Further, even inside of the liquid crystal display part, conductive layers are provided so as to be arranged as separated layers; and, when these conductive layers are to be connected with each other, an operation is carried out to form holes (through holes) in an insulation film which is formed between the conductive layers. In this case, the formation of the above-mentioned holes (through holes) in the terminal parts is usually performed simultaneously. Such simultaneous hole forming operations are performed with a view toward achieving a reduction in the manufacturing man-hours.

Further, as the insulation film, there is a known insulation film which is formed of a sequentially stacked film, which is constituted of an inorganic material layer and an organic material layer, for reducing the capacitance at a portion where the conductive film, which constitutes a layer below the insulation is film, and the conductive film, which constitutes a layer above the insulation film, are overlapped relative to each other (for example, see JP-A-2000-171817).

SUMMARY OF THE INVENTION

In the liquid crystal display device having such a constitution, it is desirable to provide a side wall surface of the through hole in the insulation film formed at the terminal part with a gentle inclination. This is so because, since the connection of the bump of the semiconductor device and the terminal is established via an anisotropic conductive film or the like, for example, it is necessary to ensure a good reliability in such a connection. This factor is not limited to the provision of an anisotropic conductive film, but the same goes for a case in which the connection is established via a blazing material.

However, in forming these through holes simultaneously with the formation of other through holes inside of the liquid crystal display part, it is inevitably necessary to make the inclination of the side wall surfaces of the other through holes inside of the liquid crystal display part gentle, thus giving rise to a drawback in that the so-called numerical aperture is reduced.

Further, when the connection of the semiconductor device with the substrate is not favorable, after mounting the semiconductor device on the substrate, it is usually necessary to perform an operation to remove the semiconductor device from the substrate and to newly mount the semiconductor device on the substrate (repair).

Here, when an organic material layer or the like is formed as the upper layer of the protective film, as mentioned above, the organic material layer is peeled off at the time of removing the semiconductor device from the substrate, and this brings about a drawback in that the reliable connection environment is broken in the terminal part.

Although it is desirable that the organic material layer is not formed on the terminal part and the periphery thereof, the reduction of the number of manufacturing man-hours is impeded when an attempt is made to achieve selective removal.

The present invention has been made under such circumstances, and one object of the present invention is to provide a display device in which the inclination of the side wall surfaces of the through holes in an insulation film formed at a terminal part is made gentler than the corresponding inclination of other through holes.

It is another object of the present invention to provide a display device in which through holes at a terminal part exhibit a good reliability in connection.

A brief explanation of representative aspects and features of the invention disclosed in this specification will be presented in the following.

(1) The present invention is, for example, directed to a display device in which a semiconductor chip is mounted on a substrate, wherein terminals, which are connected with respective bumps of the semiconductor chip, are formed by first openings formed in a first insulation film, which openings expose portions of signal lines which are formed below the first insulation film; portions of the signal lines which extend to a display part are exposed by second openings, which penetrate a second insulation film and the first insulation film, which is formed below the second insulation film, and are connected with other conductive layers, which are formed on the second insulation film; the angle of the side wall surfaces of the first openings in the first insulation film, which angle is formed with respect to the substrate, is set so as to be smaller than the angle of the side wall surfaces of the second openings in the first insulation film, which angle is formed with respect to the substrate; and the angle of the side wall surfaces of an edge of the second insulation film on a terminal side, which angle is formed with respect to the substrate, is set so as to be smaller than the angle of the side wall surfaces of the second openings in the second insulation film, which angle is formed with respect to the substrate.

(2) The display device according to the present invention is, for example, characterized in that respective regions of a display part and a terminal part are formed on a liquid-crystal-side surface of a substrate; a first insulation film is formed on the display part and the terminal part and a second insulation film is formed on other regions, except for at least the terminal part and a periphery thereof, sequentially; first through holes are formed in the display part so that the first through holes penetrate the second insulation film and the first insulation film; second through holes are formed in the terminal part so that the second through holes penetrate the first insulation film; the angle of the side wall surfaces of the second through holes in the first insulation film, which angle is formed with respect to the substrate, is set so as to be smaller than the angle of the side wall surfaces of the first through holes in the first insulation film, which angle is formed with respect to the substrate; and the angle of a side wall surface of an edge of the second insulation film on a terminal part side, which angle is formed with respect to the substrate, is set so as to be smaller than the angle of the side wall surfaces of the first through holes in the second insulation film, which angle is formed with respect to the substrate.

(3) The display device according to the present invention is, for example, on a premise of the constitution (1) or (2), characterized in that the first insulation film is formed of an inorganic material layer and the second insulation film is formed of an organic material layer.

(4) The display device according to the present invention is, for example, on a premise of the constitution (3), characterized in that signals are supplied to respective pixels of the display part via thin film transistors, and the first insulation film and the second insulation film are provided to function as a protective film, which is formed so that the protective film covers the thin film transistors.

(5) The display device according to the present invention is, for example, on a premise of the constitution (2), characterized in that in the terminal part, portions of the signal lines which are formed below the first insulation film are exposed via the second through holes that are formed in the first insulation film, and an oxide conductive film is formed so as to cover at least the exposed portions.

(6) The display device according to the present invention is, for example, on a premise of the constitution (5), characterized in that the oxide conductive film extends to an upper surface of the first insulation film on the peripheries of the second through holes, with a second insulation film interposed therebetween.

(7) The display device according to the present invention is, for example, on a premise of the constitution (5) or (6), characterized in that the oxide conductive film is made of ITO.

(8) The display device according to the present invention is, for example, on a premise of the constitution (2), characterized in that the signal lines are drain signal lines which supply signals to the respective pixels of the liquid crystal display part.

(9) The display device according to the present invention is, for example, on a premise of the constitution (2), characterized in that the signal lines are gate signal lines which supply signals to turn on the thin film transistors for the purpose of supplying the signals to the respective pixels of one group of the display part with a thin film transistor therebetween.

(10) The display device according to the present invention is, for example, a display device with a first contact hole formed in a display region and a second contact hole formed in a terminal region; a first insulating layer and a second insulating layer formed in that order; and wherein the taper angle of the first insulating layer at the first contact hole is larger than the taper angle of the first insulating layer at the second contact hole, and the taper angle of the second insulating layer at the first contact hole is larger than the taper angle of the second insulating layer around the second contact hole.

The present invention is not limited to the above-mentioned constitutions and various modifications can be made without departing from the technical concept of the present invention.

DETAILED DESCRIPTION OF THE INVENTION

Hereinafter, various embodiments of the present invention will be explained in conjunction with the drawings by taking a liquid crystal display device as an example.

Embodiment 1

Figure 2A:
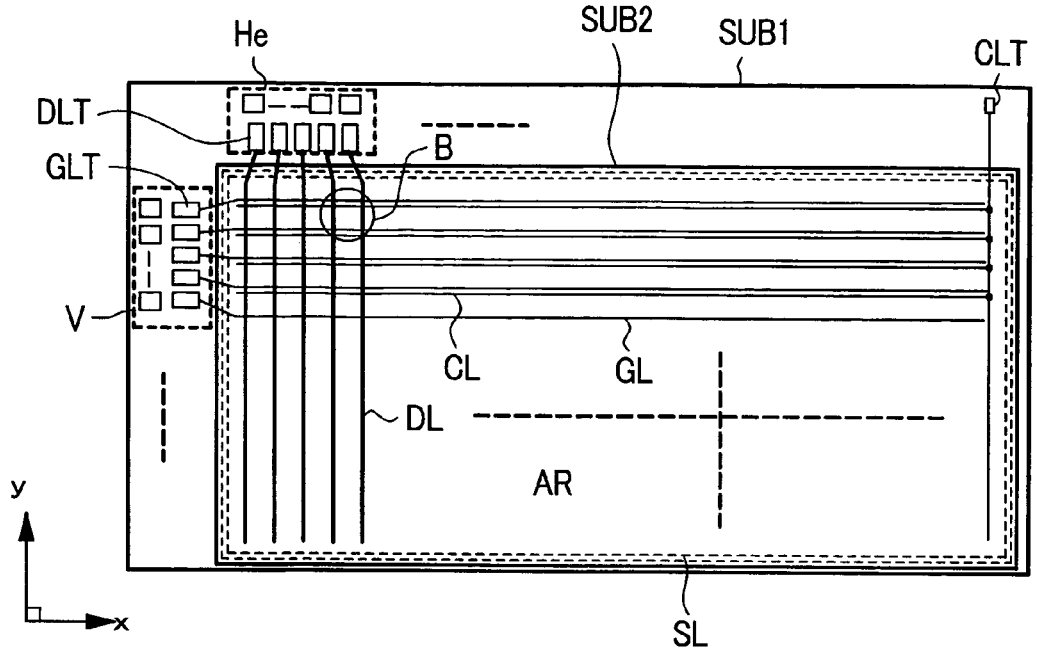
FIG. 2A is a diagram showing one embodiment of the display device.
Figure 2B:
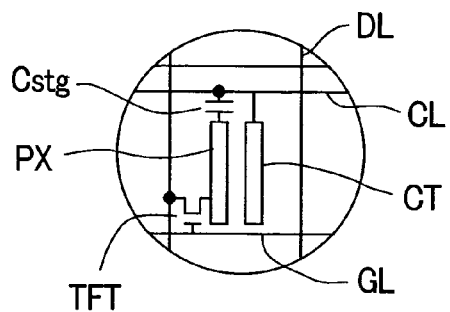
FIG. 2B is an equivalent circuit diagram showing one pixel.

FIG. 2A and FIG. 2B show one embodiment of a liquid crystal display device according to the present invention, wherein FIG. 2A is a diagram of the whole liquid crystal display device, and FIG. 2B is an equivalent circuit diagram of one pixel. FIG. 2B is a view which corresponds to a part surrounded by a circle B in FIG. 2A.

In FIG. 2A, a pair of transparent substrates SUB1, SUB2 are arranged to face each other in an opposed manner with liquid crystal disposed therebetween, wherein the liquid crystal is sealed by a sealing material SL, which is also used for fixing the other transparent substrate SUB2 to the one transparent substrate SUB1.

On a liquid-crystal-side surface of the one transparent substrate SUB1, which is surrounded by the sealing material SL, gate signal lines GL extend in the x direction and are arranged in parallel in the y direction, and drain signal lines DL which extend in the y direction and are arranged in parallel in the x direction.

Regions which are surrounded by adjacent gate signal lines GL and adjacent drain signal lines DL constitute pixel regions, and a matrix array of the respective pixel regions constitute a liquid crystal display part AR.

Further, the respective pixel regions, which are arranged in parallel in the x direction, are provided with a common counter voltage signal line CL, which runs in the inside of the respective pixel regions. The counter voltage signal line CL constitutes a signal line for supplying a voltage, which becomes a reference with respect to a video signal, to counter electrodes CT of the respective pixel regions, as will be explained later.

In each pixel region, there is a thin film transistor TFT, which is driven by a scanning signal transmitted from the one-side gate signal line GL, and a pixel electrode PX, to which the video signal is transmitted from the one-side drain signal line DL through the thin film transistor TFT.

An electric field is generated between the pixel electrode PX and the counter electrode CT, which is connected with the counter voltage signal line CL, and the optical transmissivity of the liquid crystal is controlled in response to the electric field.

One end of the respective gate signal lines GL extends over the sealing material SL, and the extending ends of the gate signal line GL constitute terminals GLT, to which output terminals of a scanning signal drive circuit V are connected. Further, input terminals of the scanning signal drive circuit V are configured to receive the inputting of the signals from a printed circuit board (not shown in the drawing), which is arranged outside a liquid crystal display panel.

The scanning signal drive circuit V is constituted of a plurality of semiconductor devices, wherein a plurality of gate signal lines GL, which are arranged close to each other, are formed into a group, and one semiconductor device is allocated to each group of gate signal lines GL.

In the same manner, one end of the respective drain signal lines DL extends over the sealing material SL, and these extending ends of the drain signal lines DL constitute terminals DLT, to which output terminals of a video signal drive circuit He are connected. Further, input terminals of the video signal drive circuit He are configured to receive signals from a printed circuit board (not shown in the drawing), which is arranged outside the liquid crystal display panel.

The video signal drive circuit He is also constituted of a plurality of semiconductor devices, wherein a plurality of drain signal lines DL, which are arranged close to each other, are formed into a group, and one semiconductor device is allocated to each group of drain signal lines DL.

Further, the counter voltage signal lines CL are connected in common at an end portion on the right side, as seen in the drawing, and a connection line extends over the sealing material SL, and an extending end constitutes a terminal. A voltage which becomes the reference with respect to the video signal is supplied from the terminal.

The respective gate signal lines GL are sequentially selected one after another in response to the scanning signal received from the scanning signal drive circuit V. Further, to the respective drain signal line DL, a video signal is supplied at the timing of selecting the gate signal line GL by the video signal drive circuit He.

Figure 3A:
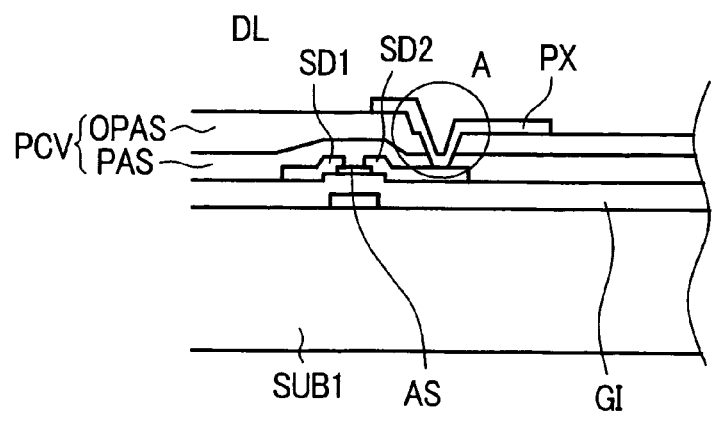
FIG. 3A is a cross-sectional view showing the constitution of a pixel of the display device according to the present invention and FIG. 3B is a cross-sectional view showing the constitution of an end part of the display device according to the present invention.
Figure 3B:
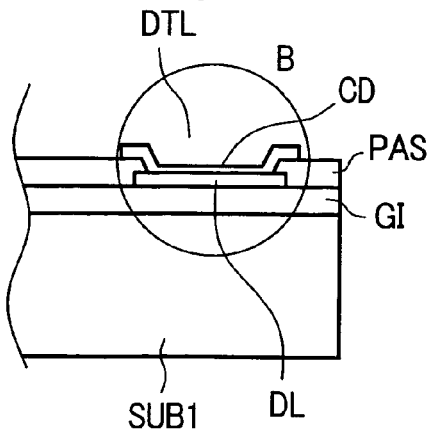

FIG. 3A is a cross-sectional view showing the region of a typical pixel, and FIG. 3B is a cross-sectional view showing the terminal DLT of the drain signal line DL.

First of all, in the region of the pixel, the gate signal lines GL are formed on a surface of the transparent substrate SUB1, and an insulation film GI is formed on the surface of the transparent substrate SUB1 such that the insulation film GI also covers the gate signal lines GL. On an upper surface of the insulation film GI, a semiconductor layer AS, which is made of amorphous Si, for example, is formed such that the semiconductor layer AS overlaps a portion of the gate signal line GL.

The semiconductor layer as forms a part of the thin film transistor TFT, which thin film transistor TFT is constituted of a MIS (Metal Insulator Semiconductor) transistor having a so-called inversely staggered structure, which uses a portion of the gate signal line GL as a gate electrode and the insulation film GI as a gate insulation film, and further includes a drain electrode SD1 and a source electrode SD2 to be described later.

Further, the drain electrodes SD1 and the source electrodes SD2 are formed simultaneously at the time of forming the drain signal lines DL, wherein the drain electrode SD1 and the source electrode SD2 are connected with the semiconductor layer AS at one end and another end of the semiconductor layer AS, respectively. Here, the source electrode SD2 is connected with the pixel electrode PX and is provided with an extending portion which slightly extends in the direction toward the center of the pixel to provide a connecting portion.

Then, on the surface of the transparent substrate SUB1, on which the drain signal lines DL (drain electrodes SD1) and the source electrodes SD2 are formed, a protective film PCV is formed such that the protective film PCV also covers the drain signal lines DL and the like. The protective film PCV is a film which avoids direct contact between the thin film transistor TFT and the liquid crystal so as to prevent deterioration of the properties of the thin film transistor TFT.

Further, the protective film PCV is formed as a sequentially stacked structure which is constituted of a protective film PAS, which is formed of an inorganic material layer made of SiN, for example, and a protective film OPAS, which is formed of an organic material layer made of resin, for example. Such a structure is provided for imparting reliability in the form of a protective function to the protective film PCV by the protective film PAS and for reducing the capacitance of the whole protective film PCV by the protective film OPAS.

In portions of the protective film PCV, through holes are formed which penetrate the protective film OPAS and the protective film PAS, so that the pixel electrodes PX, which are formed on an upper surface of the protective film PCV, can be connected with the source electrodes SD2 of the thin film transistors TFT via the through holes.

Here, although the counter electrode CT (and the counter voltage signal line CL), which is used to generate an electric field between the counter electrode CT and the pixel electrode PX, is not shown in the drawing, the counter electrode CT may be formed on the same layer as the pixel electrode PX, or it may be formed between other layers, for example, between the insulation film INS and the protective film PAS. It is needless to say that the counter electrode CT may be formed on the other substrate and be arranged to face the pixel electrode PX in an opposed manner.

Further, in a region where the terminals DLT shown in FIG. 3B are formed, the drain signal line DL extends on an upper surface of the insulation film GI, and a portion of the extending portion is exposed by a through hole formed in the protective film PAS, through which the exposed portion is connected with a conductive layer CD, which is formed on the portion or in the periphery thereof.

Provided that the pixel electrodes PX are formed of, for example, ITO (Indium Tin Oxide), ITZO (Indium Tin Zinc Oxide), IZO (Indium Zinc Oxide), $SnO_2$ (Tin Oxide), $In_2O_3$ (Indium Oxide) or the like, the conductive layers CD are formed simultaneously with the formation of the pixel electrodes PX; and, hence, the manufacturing man-hours can be reduced, and, at the same time, it is possible to form terminals which exhibit a desired reliability against electrolytic corrosion.

The protective film OPAS is not formed on the terminals DLT and on the peripheries of the terminals, and it has edges which are arranged in the vicinity of the terminals DLT and extend from the liquid crystal display part AR.

The relationship between the through hole portion of the protective film PAS in the pixel portion, as seen in the drawing (circled frame A in FIG. 3A), and the through hole portion of the protective film PAS in the terminal DLT portion (circled frame B in FIG. 3B), will be explained in detail in conjunction with FIGS. 1A and 1B.

Figure 1A:
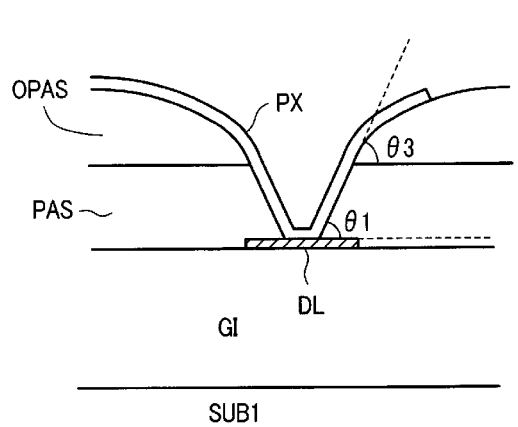
FIG. 1A and FIG. 1B are diagrams showing the constitution of a characteristic part of a display device according to one embodiment of the present invention.
Figure 1B:
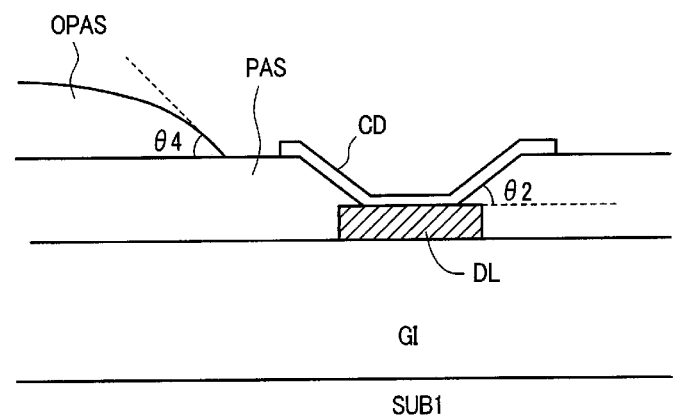

FIG. 1A is a detailed view of the portion shown in the circled frame A in FIG. 3A, and FIG. 1B is a detailed view of the portion shown in the circled frame B in FIG. 3B.

As can be clearly understood from FIG. 1A and FIG. 1B, an angle θ2 of a side wall surface of the through hole formed in the protective film PAS at the terminal part, which is formed with respect to the transparent substrate SUB1 (an angle which is formed with respect to a plane of the substrate or an angle which is formed with respect to an upper surface of the drain signal line DL) is set so as to be smaller than an angle θ1 of a side wall surface of the through hole formed in the protective film PAS at the pixel portion, which angle is formed with respect to the transparent substrate SUB1 (an angle which is formed with respect to a plane of the substrate or an angle which is formed with respect to an upper surface of the drain signal line DL).

Further, with respect to the angle of the side wall surface of the protective film OPAS, an angle θ4 of the side wall surface of the protective film OPAS at the edge of the terminal part side, which angle is formed with respect to the transparent substrate SUB1, is set so as to be smaller than the angle θ3 of the side wall surface of the protective film OPAS in the through hole of the pixel portion, which angle is formed with respect to the transparent substrate SUB1.

In a display device having such a constitution, the inclination of the side wall surface of the through hole at the terminal part is formed gently, and, hence, the coating of the conductive layer CD can be performed reliably, whereby the connection of the terminal parts with the bumps of the semiconductor device can be established favorably.

Further, in the through holes formed in the terminal part, the inclination of the side wall surfaces is formed so as to be gentler compared to the inclination of the side wall surfaces of the through hole formed in the pixel portion. Accordingly, the size of the through holes formed in the pixel portion can be reduced, whereby a lowering of the numerical aperture of the pixel portion can be obviated.

Further, since the protective film OPAS is not formed in the terminal part and the periphery thereof, even when a repair of the semiconductor device is required, it is no longer necessary to worry about the drawback attributed to the peeling-off of the protective film OPAS.

In this case, the constitution, in which the inclination of the side wall surface of the edge on the terminal part side of the protective film OPAS is set so as to be gentler than the inclination of the side wall surfaces of the through holes in the inside of the pixel portion, indicates that the protective film OPAS can be used as a mask at the time of forming the through holes in the terminal part.

Figure 4:
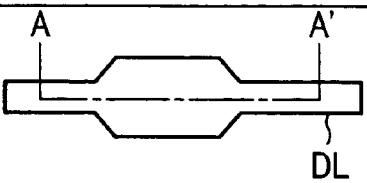
FIG. 4 is a flow chart showing one example of a method of manufacture of the terminal part of the display device according to the present invention.
Figure 4:
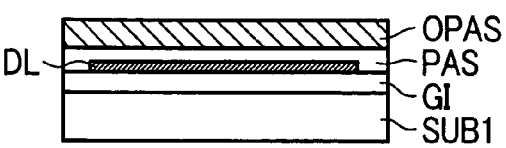
Figure 4:
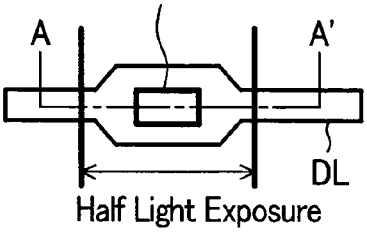
Figure 4:
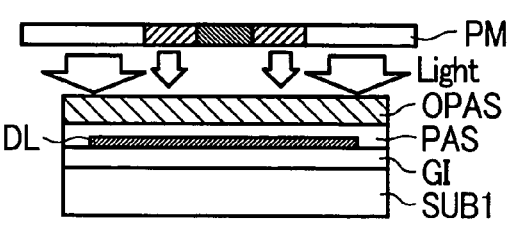
Figure 4:
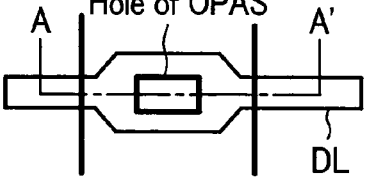
Figure 4:
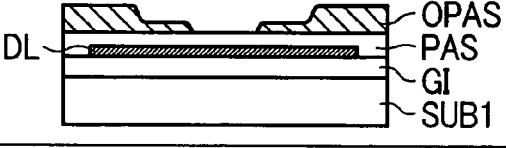
Figure 4:
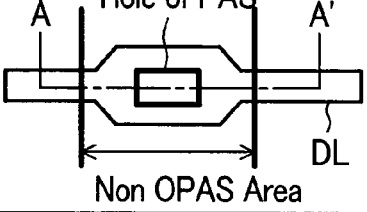
Figure 4:
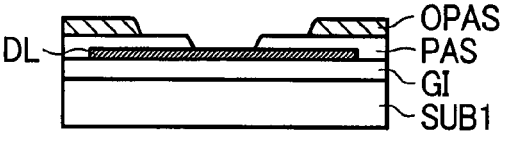
Figure 4:
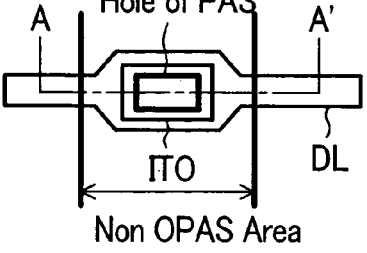
Figure 4:
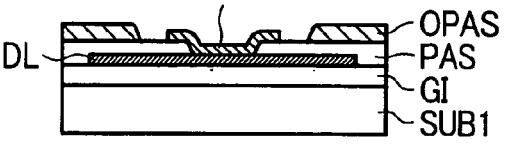

FIG. 4 shows one example of the steps which may be employed in the manufacture of the terminal part DLT of the drain signal line DL. In FIG. 4, respective steps (a) to (e) are shown in left column along with the names of the steps; plan views of the terminal part at the time of the corresponding steps are shown in the center column; and cross-sectional views taken along a line A-A' in the plan views shown in the center column are shown in the right column. Hereinafter, the manufacturing method of the manufacture will be explained in order the of the steps thereof.

Step (a)

The terminals which are connected with the drain signal lines DL by way of the insulation film GI are formed on the upper surface of the transparent substrate SUB1; and, thereafter, the protective film PAS made of the inorganic material and the protective film OPAS made of the organic material are formed sequentially on the upper surface of the transparent substrate SUB1 such that the protective film PAS and the protective film OPAS also cover the drain signal lines DL and the terminals.

Step (b)

To form holes for the contacts in the protective film OPAS, the protective film OPAS is subjected to a half light exposure. As a mask PM which is used for the half light exposure, a mask is used which completely shields portions, which correspond to the formation of the contacts, from light, partially allows light to transmit, while blocking the remaining light at the peripheries of the portions, and allows sufficient light to pass through in further areas of the peripheries.

Corresponding to such a constitution, with respect to the protective film OPAS, the light is blocked in the regions where the holes for contacts are formed, and the light is allowed to transmit in other regions, while an exposure which partially blocks the light is provided at the peripheries of the regions where the holes are formed.

Step (c)

The protective film OPAS is etched. The protective film OPAS is removed corresponding to the degree of light shielding; and, hence, holes are formed in the regions where the contacts are formed to an extent that the surface of the protective film PAS which is arranged below the protective film OPAS is exposed, while the surface of the protective film PAS is not yet exposed on the peripheries of the regions where the contacts are formed and only the recessed portions are formed.

Step (d)

Using the protective film OPAS as a mask, the protective film PAS, which is arranged below the protective film OPAS, is etched. The holes are formed in the protective film PAS in the regions where the contacts are formed and the terminals which are arranged below the protective film PAS are exposed. Here, the surface of the protective film OPAS is also uniformly etched, and the protective film OPAS is removed until the surface of the protective film PAS is exposed in the portions in the peripheries of the regions where the contacts are formed (the portions corresponding to the recessed portions).

Step (e)

The ITO film is formed and is selectively etched, thus forming the conductive layers which are connected with the terminals of the drain signal lines DL in the regions where the contacts are formed. The conductive layers are formed in the inside of the regions where the protective film OPAS is removed and is not formed such that the conductive layers bridge over the protective film OPAS.

In the description of the above-mentioned embodiment, the constitution of the terminal parts of the drain signal lines DL was based on the relationship of the terminal parts with the through holes formed in the pixel portions. However, it is needless to say that the above-mentioned embodiment is applicable to the terminal portions GLT of the gate signal lines GL in the constitution shown in FIG. 3A.

Figure 5:
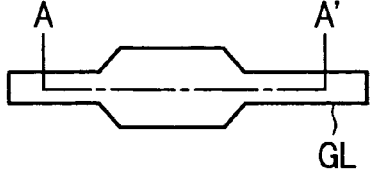
FIG. 5 is a flow chart showing another of a method of manufacture of the terminal part of the display device according to the present invention.
Figure 5:
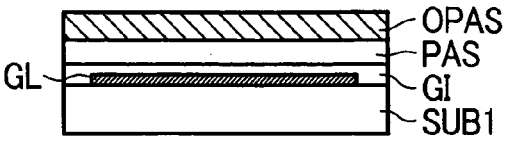
Figure 5:
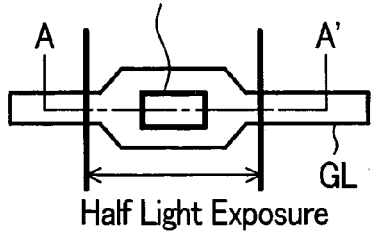
Figure 5:
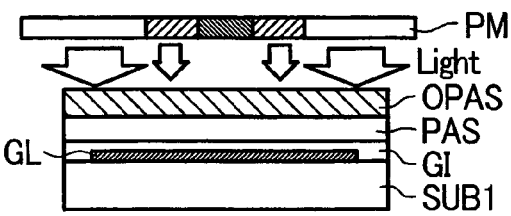
Figure 5:
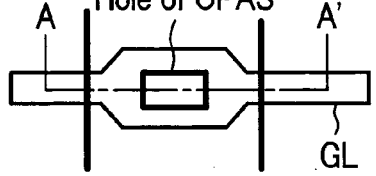
Figure 5:
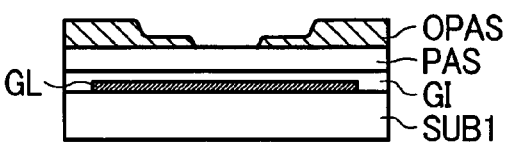
Figure 5:
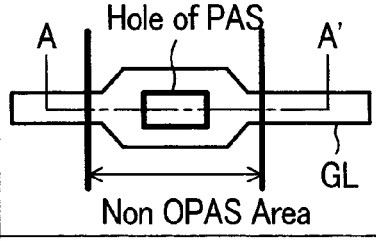
Figure 5:
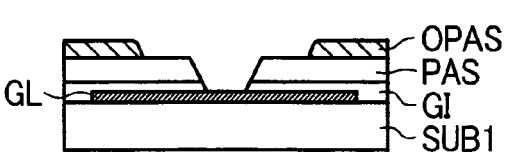
Figure 5:
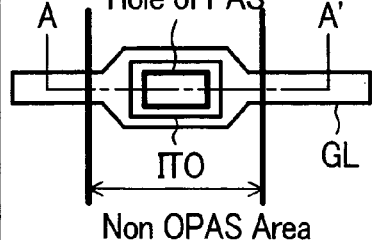
Figure 5:
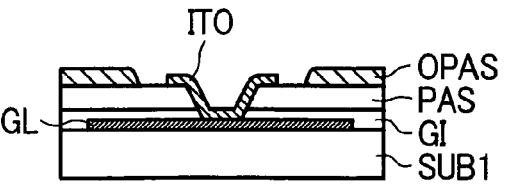

FIG. 5 shows one example of a manufacturing method that may be used when the invention is applied to the terminal portions GLT of the gate signal line GL, and it corresponds to the method shown in FIG. 4. Hereinafter, the method of manufacture will be explained in the order of the steps thereof.

Step (a)

The terminals which are connected with the gate signal lines GL are formed on the upper surface of the transparent substrate SUB1; and, thereafter, the insulation film GI is formed on the upper surface of the transparent substrate SUB1 so that the insulation film GI also covers the gate signal lines GL. Further, on upper surfaces of the insulation films GI, a protective film PAS made of an inorganic material and a protective film OPAS made of an organic material are sequentially formed.

Step (b)

To form holes for the contacts in the protective film PAS, the protective film OPAS is subjected to a half light exposure. As a mask PM which is used for the half light exposure, a mask is used which completely shields portions which correspond to the formation of the contacts from light, partially allows light to transmit, while blocking the remaining light at the peripheries of the portions, and allows sufficient light to pass through in further areas of the peripheries is used.

Corresponding to such a constitution, with respect to the protective film OPAS, the light is blocked in the regions where the holes for contacts are formed, and the light is allowed to transmit in other regions, while an exposure which partially blocks the light is carried out at the peripheries of the regions where the holes are formed.

Step (c)

The protective film OPAS is etched. The protective film OPAS is removed corresponding to the degree of light shielding; and, hence, holes are formed in the regions where the contacts are formed to an extent that the surface of the protective film PAS is exposed, while the surface of the protective film PAS is not yet exposed at the peripheries of the regions where the contacts are formed and only the recessed portions are formed.

Step (d)

Using the protective film OPAS as a mask, the protective film PAS, which is arranged below the protective film OPAS, and the insulation film GI, which is arranged below the protective film OPAS, are etched. The holes are formed in the protective film PAS and the insulation film GI in the regions where the contacts are formed, and the terminals which are arranged below the insulation film GI are exposed. Here, the surface of the protective film OPAS is also uniformly etched, and the protective film OPAS is removed until the surface of the protective film PAS is exposed in the portions in the peripheries of the regions where the contacts are formed (the portions corresponding to the recessed portions).

Step (e)

The ITO film is formed and is selectively etched, thus forming the conductive layers CD, which are connected with the terminals of the gate signal lines GL in the regions where the contacts are formed. The conductive layers are formed in the inside of the regions where the protective film OPAS is removed and is not formed such that the conductive layers bridge over the protective film PAS.

In the method shown in FIG. 4, at the time of forming the through holes in the protective film PAS using the protective film OPAS as a mask, care is taken to prevent the surface of the protective film PAS that is exposed from the protective film OPAS from being lightly etched gradually. However, it is needless to say that the present invention is not limited to such a technique, and a light etching may be performed.

Figure 6:
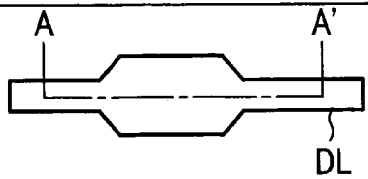
FIG. 6 is a flow chart showing another example of a method of manufacture of the terminal part of the display device according to the present invention.
Figure 6:
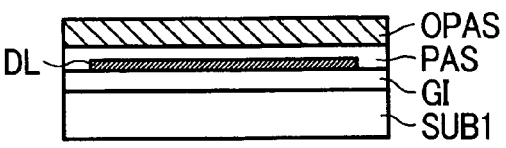
Figure 6:
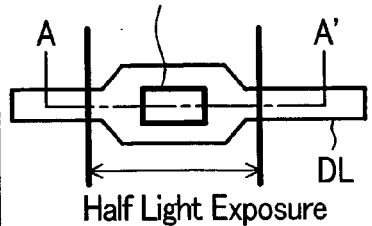
Figure 6:
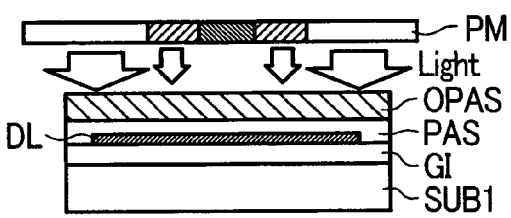
Figure 6:
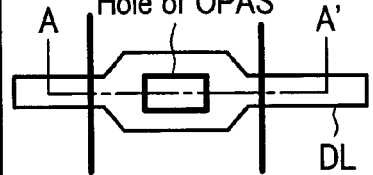
Figure 6:
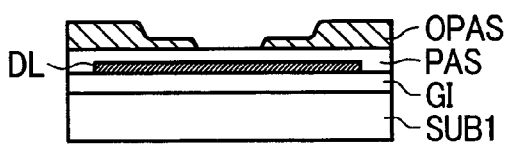
Figure 6:
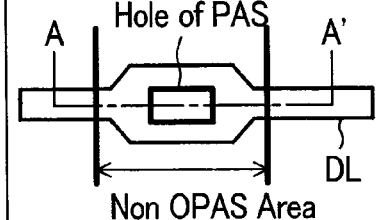
Figure 6:
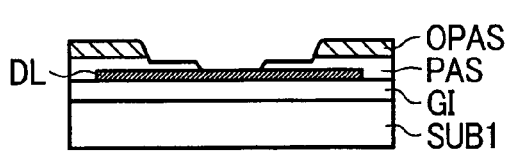
Figure 6:
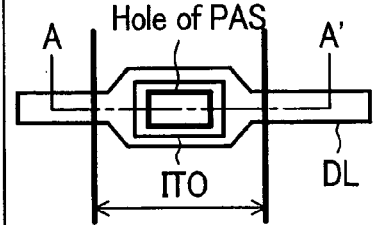
Figure 6:
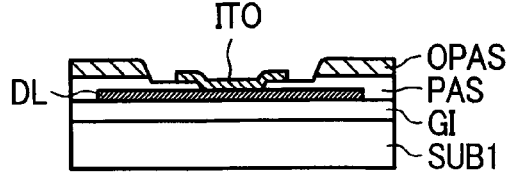

FIG. 6 shows one example of a manufacturing method in which a portion of the surface of the protective film PAS, which is exposed from the protective film OPAS, is etched. Hereinafter, the manufacturing method will be explained in the order of the steps thereof.

Step (a)

The terminals which are connected with the drain signal lines DL by way of the insulation film GI are formed on the upper surface of the transparent substrate SUB1 and, thereafter, the protective film PAS made of the inorganic material and the protective film OPAS made of the organic material are formed sequentially on the upper surface of the transparent substrate SUB1 such that the protective film PAS and the protective film OPAS also cover the drain signal lines DL and the terminals.

Step (b)

To form holes for the contacts in the protective film OPAS, the protective film OPAS is subjected to a half light exposure. As a mask PM which is used for the half light exposure, a mask is used which completely shields portions which correspond to the formation of the contacts from light, partially allows light to transmit while blocking the remaining light at the peripheries of the portions, and allows sufficient light to pass through in further areas of the peripheries.

Corresponding to such a constitution, with respect to the protective film OPAS, the light is blocked in the regions where the holes for contacts are formed, and the light is allowed to transmit in other regions, while an exposure which partially blocks the light is provided at the peripheries of the regions where the holes are formed.

Step (c)

The protective film OPAS is etched. The protective film OPAS is removed corresponding to the degree of light shielding; and, hence, holes are formed in the regions where the contacts are formed to an extent that the surface of the protective film PAS is exposed, while the surface of the protective film PAS is not yet exposed at the peripheries of the regions where the contacts are formed and only the recessed portions are formed.

Step (d)

Using the protective film OPAS as a mask, the protective film PAS, which is arranged below the protective film OPAS, is etched. The holes are formed in the protective film PAS in the regions where the contacts are formed and the terminals which are arranged below the protective film PAS are exposed. Here, the surface of the protective film OPAS is also uniformly etched and the protective film OPAS is removed until the surface of the protective film PAS is exposed in the portions in the peripheries of the regions where the contacts are formed (the portions corresponding to the recessed portions). Then, the etching is continued to slightly etch the surface of the protective film PAS which is exposed from the protective film OPAS.

Step (e)

The ITO film is formed and is selectively etched, thus forming the conductive layers which are connected with the terminals of the drain signal lines DL in the regions where the contacts are formed. The conductive layers are formed in the inside of the regions where the protective film OPAS is removed and are not formed such that the conductive layers bridge over the protective film OPAS.

Figure 7:
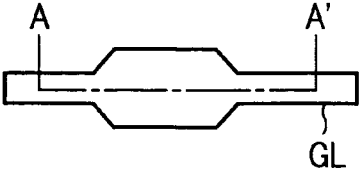
FIG. 7 is a flow chart showing another example of a method of manufacture of the terminal part of the display device according to the present invention.
Figure 7:
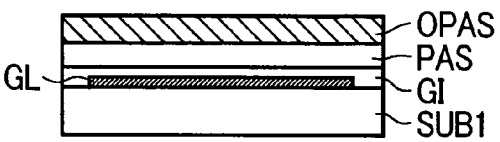
Figure 7:
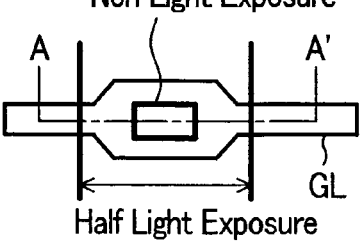
Figure 7:
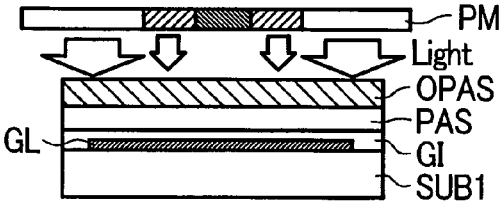
Figure 7:
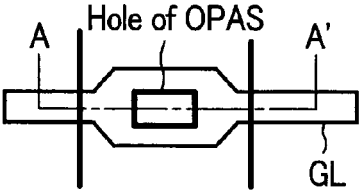
Figure 7:
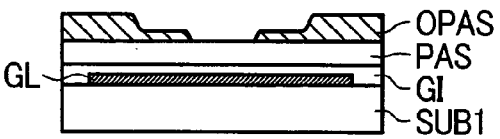
Figure 7:
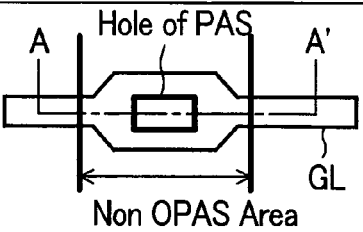
Figure 7:
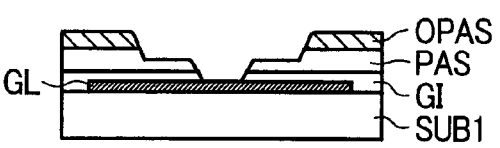
Figure 7:
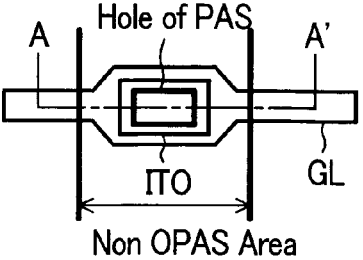
Figure 7:
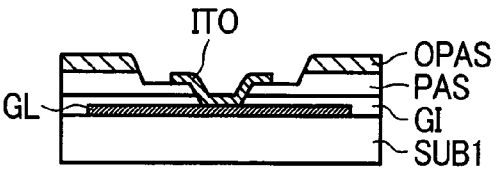

Using substantially the same technical concept, it is possible to execute the steps in the same manner in the method shown in FIG. 5. FIG. 7 shows one embodiment of such a manufacturing method, which will be explained in the order of the steps thereof hereinafter.

Step (a)

The terminals which are connected with the gate signal lines GL are formed on the upper surface of the transparent substrate SUB1, and the insulation film GI is formed on the upper surface of the transparent substrate SUB1 so that the insulation film GI also covers the gate signal line GL. Further, the protective film PAS made of the inorganic material and the protective film OPAS made of the organic material are formed sequentially on the upper surface of the insulation film GI.

Step (b)

To form holes for the contacts in the protective film PAS, the protective film OPAS is subjected to a half light exposure. As a mask PM which is used for the half light exposure, a mask is used which completely shields portions which correspond to the formation of the contacts from light, partially allows light to transmit, while blocking the remaining light at the peripheries of the portions, and allows sufficient light to pass through in further areas of the peripheries.

Corresponding to such a constitution, with respect to the protective film OPAS, the light is blocked in the regions where the holes for contacts are formed and the light is allowed to transmit in other regions, while the exposure which partially blocks the light is carried out at the peripheries of the regions where the holes are formed.

Step (c)

The protective film OPAS is etched. The protective film OPAS is removed corresponding to the degree of light shielding; and, hence, the holes are formed in the regions where the contacts are formed to an extent that the surface of the protective film PAS, which is arranged below the protective film OPAS, is exposed, while the surface of the protective film PAS is not yet exposed at the peripheries of the regions where the contacts are formed and only the recessed portions are formed.

Step (d)

Using the protective film OPAS as a mask, the protective film PAS, which is arranged below the protective film OPAS, and the insulation film GI, which is arranged below the protective film PAS, are etched. The holes are formed in the protective film PAS and the insulation film GI in the regions where the contacts are formed, and the terminals which are arranged below the insulation film GI are exposed. Here, the surface of the protective film OPAS is also uniformly etched, and the protective film OPAS is removed until the surface of the protective film PAS is exposed in the portions in the peripheries of the regions where the contacts are formed (the portions corresponding to the recessed portions). Further, the etching is continued so as to lightly etch the surface of the protective film PAS exposed from the protective film OPAS.

Step (e)

The ITO film is formed and is selectively etched, thus forming the conductive layers CD which are connected with the terminals of the gate signal lines GL in the regions where the contacts are formed. The conductive layers are formed in the inside of the regions where the protective film OPAS is removed and are not formed such that the conductive layers bridge over the protective film PAS.

In the manufacturing method shown in FIG. 4, care is taken to prevent the protective film OPAS from remaining in the peripheries of the through holes at the time of forming the through holes in the protective film PAS using the protective film OPAS as a mask. However, it is needless to say that the present invention is not limited to such a case, and the protective film OPAS may slightly remain. This is because such a constitution can also obtain the substantially the same advantageous effect.

Figure 8:
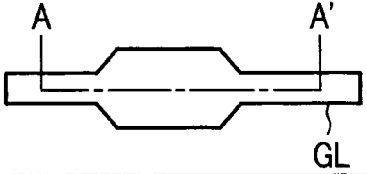
FIG. 8 is a flow chart showing another example of a method of manufacture of the terminal part of the display device according to the present invention.
Figure 8:
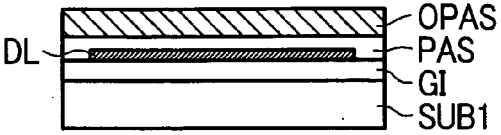
Figure 8:
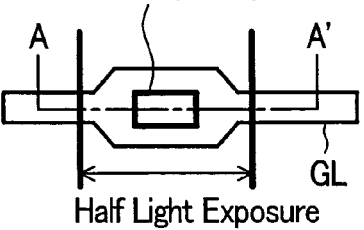
Figure 8:
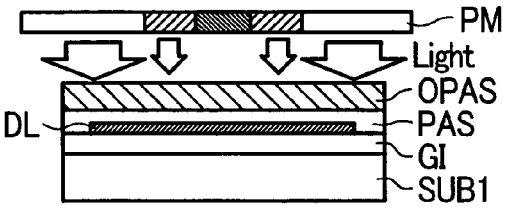
Figure 8:
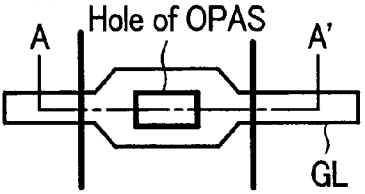
Figure 8:
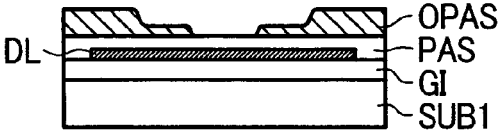
Figure 8:
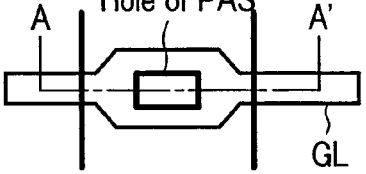
Figure 8:
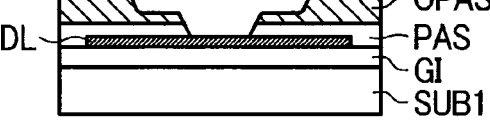
Figure 8:
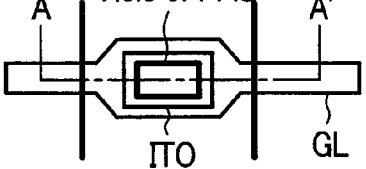
Figure 8:
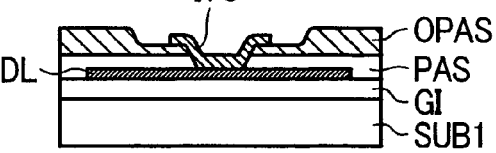
Figure 8:
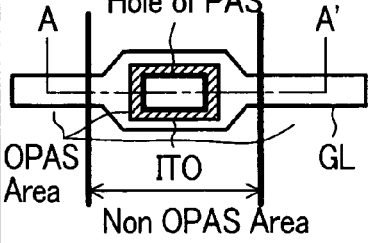
Figure 8:
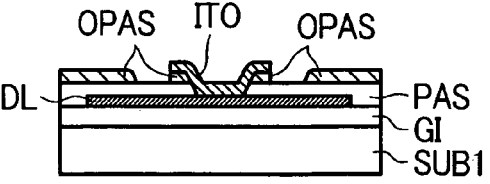

FIG. 8 shows one example of a manufacturing method which will be explained hereinafter in the order of the steps thereof.

Step (a)

The terminals, which are connected with the drain signal lines DL by way of the insulation layer GI, are formed on the upper surface of the transparent substrate SUB1; and, thereafter, the protective film PAS made of the inorganic material and the protective film OPAS made of the organic material are formed sequentially on the upper surface of the transparent substrate SUB1 such a way that the protective film PAS and the protective film OPAS also cover the drain signal lines DL and the terminals.

Step (b)

To form holes for the contacts in the protective film OPAS, the protective film OPAS is subjected to half light exposure. As a mask PM which is used for the half light exposure, a mask which completely shields portions which correspond to the formation of the contacts from light, partially allows light to transmit, while blocking the remaining light in peripheral portions, and allows the sufficient light to pass through in further areas of the peripheries is used.

Corresponding to such a constitution, with respect to the protective film OPAS, the light is blocked in the regions where the holes for contacts are formed, and the light is allowed to transmit in other regions, while an exposure which partially blocks the light is carried out at the peripheries of the regions where the holes are formed.

Step (c)

The protective film OPAS is etched. The protective film OPAS is removed corresponding to the degree of light shielding; and, hence, the holes are formed in the regions where the contacts are formed to an extent that the surface of the protective film PAS which is arranged below the protective film OPAS is exposed, while the surface of the protective film PAS is not yet exposed in the peripheries of the regions where the contacts are formed and only the recessed portions are formed.

Step (d)

Using the protective film OPAS as a mask, the protective film PAS, which is arranged below the protective film OPAS, is etched. The holes are formed in the protective film PAS in the regions where the contacts are formed, and the terminals which are arranged below the protective film PAS are exposed. Here, although the surface of the protective film OPAS is also substantially uniformly etched, the etching is not performed to such an extent that the surface of the protective film PAS is exposed, and the etching is stopped at a stage in which the protective film OPAS is allowed to remain in the peripheries of the through holes as a thin layer.

Step (e)

The ITO film is formed and is selectively etched, thus forming the conductive layers which are connected with the terminals of the drain signal lines DL in the regions where the contacts are formed. The conductive layers are formed such that the protective film OPAS is interposed as a layer in the vicinity thereof.

Step (f)

By ashing the protective film OPAS using a gas, such as $O_2$ plasma, the following structure is formed. That is, the protective film OPAS partially remains below the ITO film; and, thereafter, the region where the protective film PAS is exposed is present; and, thereafter, the region where the protective film OPAS is formed on the protective film PAS is present.

Figure 9:
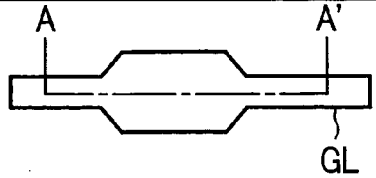
FIG. 9 is a flow chart showing another example of a method of manufacture of the terminal part of the display device according to the present invention.
Figure 9:
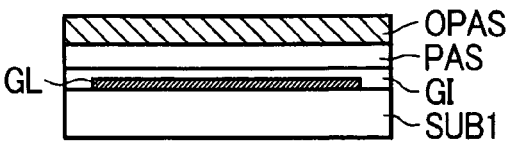
Figure 9:
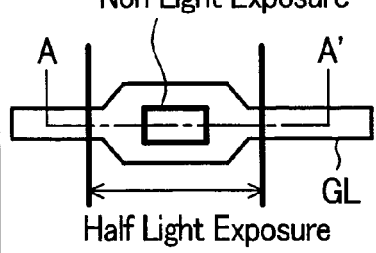
Figure 9:
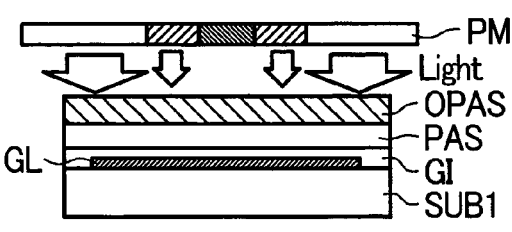
Figure 9:
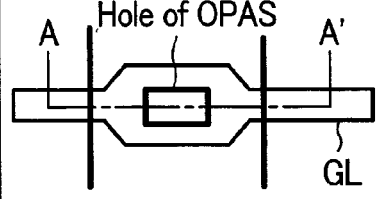
Figure 9:
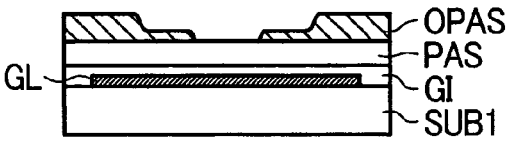
Figure 9:
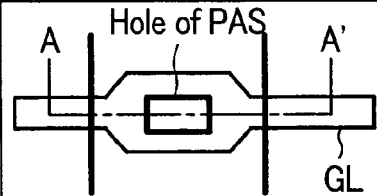
Figure 9:
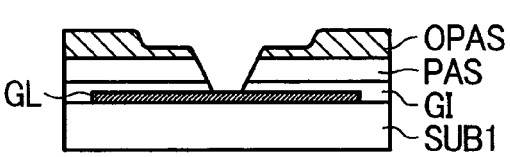
Figure 9:
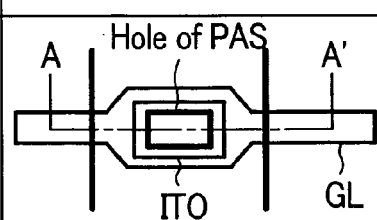
Figure 9:
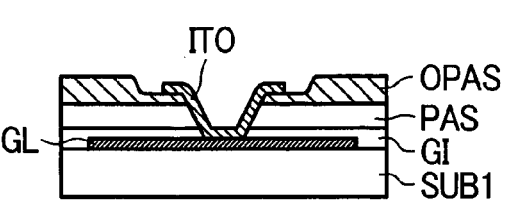
Figure 9:
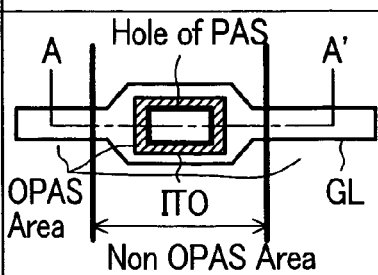
Figure 9:
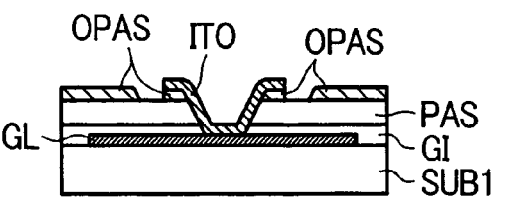

Using substantially the same technical concept, it is possible to modify the manufacturing method shown in FIG. 5 in the same manner. FIG. 9 shows one embodiment of such a method, which will be explained in the order of the steps thereof.

Step (a)

The terminals which are connected with the gate signal lines GL are formed on the upper surface of the transparent substrate SUB1, and the insulation film GI is formed on the upper surface of the transparent substrate SUB1 in such a way that the insulation film GI also covers the gate signal lines GL. Further, the protective film PAS made of the inorganic material and the protective film OPAS made of the organic material are formed sequentially on the upper surface of the insulation film GI.

Step (b)

To form holes for the contacts in the protective film PAS, the protective film OPAS is subjected to half light exposure. As a mask PM which is used for the half light exposure, a mask which completely shields portions which correspond to the formation of the contacts from light, partially allows light to transmit, while blocking the remaining light in peripheral portions, and allows the sufficient light to pass through in further areas of the peripheries is used.

Corresponding to such a constitution, with respect to the protective film OPAS, the light is blocked in the regions where the holes for contacts are formed, and the light is allowed to transmit in other regions, while an exposure which partially blocks the light is carried out at the peripheries of the regions where the holes are formed.

Step (c)

The protective film OPAS is etched. The protective film OPAS is removed corresponding to the degree of light shielding; and, hence, the holes are formed in the regions where the contacts are formed to such an extent that the surface of the protective film PAS which is arranged below the protective film OPAS is exposed, while the surface of the protective film PAS is not yet exposed in the peripheries of the regions where the contacts are formed and only the recessed portions are formed.

Step (d)

Using the protective film OPAS as a mask, the protective film PAS, which is arranged below the protective film OPAS, and the insulation film GI, which is arranged below the protective film PAS, are etched. The holes are formed in the protective film PAS and the insulation film GI in the regions where the contacts are formed, and the terminals which are arranged below the insulation film GI are exposed. Here, although the surface of the protective film OPAS is also substantially uniformly etched, the etching is not performed to such an extent that the surface of the protective film PAS is exposed, and the etching is stopped at a stage in which the protective film OPAS is allowed to remain in the peripheries of the through holes as a thin layer.

Step (e)

The ITO film is formed and is selectively etched, thus forming the conductive layers which are connected with the terminals of the gate signal lines GL in the regions where the contacts are formed. The conductive layers are formed in such a way that the protective film OPAS is interposed as a layer in the vicinity thereof.

Step (f)

By ashing the protective film OPAS using a gas, such as $O_2$ plasma, the following structure is formed. That is, the protective film OPAS partially remains below the ITO film; and, thereafter, the region where the protective film PAS is exposed is present; and, thereafter, the region where the protective film OPAS is formed on the protective film PAS is present.

In the terminal parts having the structures shown in FIG. 8 and FIG. 9, it is possible to increase the size of stepped portions of recessed portions of the ITO. Accordingly, it is possible to obtain an advantageous effect in that, at the time of connecting the terminal and the semiconductor element using the anisotropic conductive film, it is possible to suppress the flow-out of the anisotropic conductive film to the outside of the terminal part.

In the above-mentioned manufacturing method, by adjusting the quantity of the exposure to the protective film OPAS, it is possible to control the etching rate of the protective film OPAS. This is an advantageous effect that is brought about by a manufacturing method which uses a half exposure. It is no longer necessary to form the protective films OPAS having a plurality of thicknesses individually, and so the number of processing steps can be reduced, thus giving rise to an advantageous effect in that the manufacturing cost can be reduced.

On the other hand, when the exposure of the protective film OPAS is a half exposure, irregularities in the exposure are liable to be easily generated due to reflection light (the reflection caused by the signal lines) in the parallel direction of the terminals in the vicinity of the terminal part (corresponding to the parallel direction of the signal lines which are connected with the terminals) to a greater extent than in the extending direction of the terminals. Accordingly, it is desirable to carry out deliberate control of the exposure quantity to perform a uniform exposure. This is because the time necessary for exposure processing is prolonged, and, hence, the cost lowering effect is slightly reduced.

Accordingly, inventors of the present invention have further invented a terminal structure in which irregularities in the exposure are hardly generated.

Figure 10A:
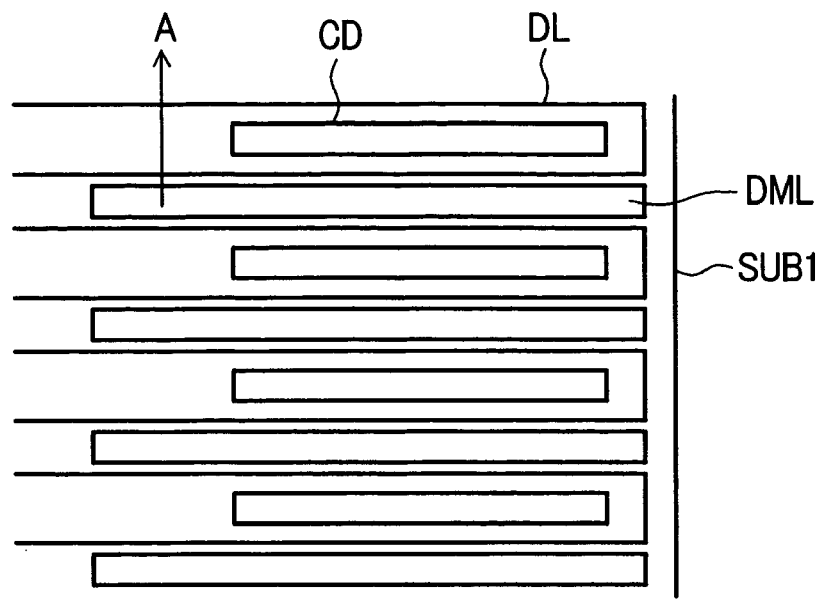
FIG. 10A and FIG. 10B are plan views showing another embodiment of the terminal part of the display device according to the present invention.

FIG. 10A shows one example. For example, at the time of forming the drain signal lines DL, signal lines DML are simultaneously formed between the respective drain signal lines DL, which are arranged in parallel. Due to such a constitution, the reflectance of light in the direction indicated by an arrow A in the drawing becomes substantially uniform; and, hence, it is possible to achieve an exposure with no irregularities.

Further, the exposure to the protective film OPAS is performed by the above-mentioned half exposure. With respect to a photo mask PM, which is used for the half exposure, in a portion which performs a partial transmission of light and a partial blocking of light, a plurality of strip-like light blocking portions are formed, which extend in one direction and are arranged in a direction which intersects the one direction.

In using such an exposure mask, due to the relationship with the light blocking portions of the exposure mask, there may be a case in which is interference fringe is formed in the extending direction of the terminals. Accordingly, as shown in FIG. 10B, dummy signal lines DML are intermittently formed along the longitudinal direction, wherein the pitch thereof is set to a value which avoids an integer times the pitch of the strip-like light blocking portions.

Figure 10B:
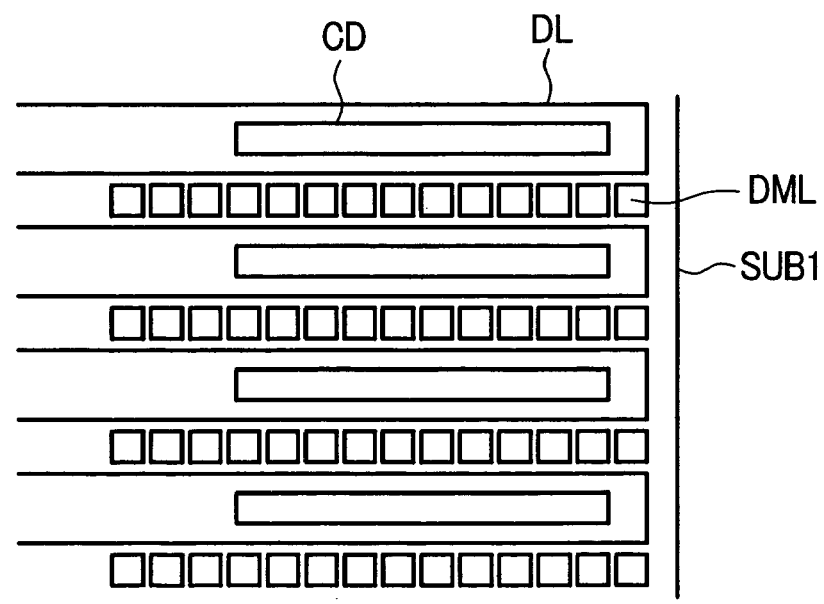

Here, the application of the constitutions shown in FIG. 10A and FIG. 10B is not limited to a so-called COG method, and these constitutions are widely applicable to general connection terminals for connecting a printed circuit board and films on which terminals are formed.

The above-mentioned respective embodiments may be used in a single form or in combination. This is because it is possible to obtain the advantageous effects of these embodiments individually or synergistically.

Further, in the above-mentioned embodiments, the through holes which are formed in the pixel portion are connected with the conductive layers, which are positioned below the pixel electrodes. However, it is needless to say that the counter electrodes may replace the pixel electrodes. This is because the electric field applied to the liquid crystal has a relative value, and, hence, there is no difference in designating either one of the electrodes as the pixel electrode or the counter electrode.

Here, although an explanation has been given by taking a liquid crystal display device as an example in all if the above-mentioned embodiments, it is needless to say that the present invention is applicable to other types of display device, such as an organic EL display device or the like, for example. This is because, that although an organic EL display device may differ from a liquid crystal display device with respect to the constitution that in which emitting layers made of a solid body are sandwiched between pixel electrodes and counter electrodes in place of the liquid crystal and an electric current is supplied to the light emitting layers through these electrodes, there is no difference with respect to the other constitution compared with the above-mentioned constitution. Further, the organic EL display device also has the above-mentioned drawbacks with the respect to at least the through holes formed in the pixel portion and the through holes formed in the terminal part.

What is claimed is:

1. A display device which mounts a semiconductor chip on a substrate, wherein
   terminals which are connected with respective bumps of the semiconductor chip are formed by first openings formed in a first insulation film which expose portions of signal lines which are formed below the first insulation film,
   extending portions of the signal lines to a display part are exposed by second openings which penetrate a second insulation film and the first insulation film which is formed below the second insulation film and are connected with another conductive layers which are formed on the second insulation film,
   an angle of side wall surfaces of the first openings in the first insulation film which is made with respect to the substrate is set smaller than an angle of side wall surfaces of the second openings in the first insulation film which is made with respect to the substrate, and
   an angle of side wall surfaces of the second insulation film which is made with respect to the substrate at an edge of the second insulation film on a terminal side is set smaller than an angle of the side wall surfaces of the second insulation film which is made with respect to the substrate at the second openings.

2. A display device according to claim 1, wherein the first insulation film is formed of an inorganic material layer and the second insulation film is formed of an organic material layer.

3. A display device according to claim 2, wherein signals are supplied to respective pixels of the display part via thin film transistors, and the first insulation film and the second insulation film are provided to function as a protective film which is formed in a state that the protective film covers the thin film transistors.

4. A display device according to claim 1, wherein in the terminal part, portions of the signal lines which are formed below the first insulation film are exposed via the second openings formed in the first insulation film, and an oxide conductive film is formed so as to cover at least exposed portions.

5. A display device according to claim 4, wherein the oxide conductive film extends over an upper surface of the first insulation film on peripheries of the second openings with a portion of the second insulation film interposed therebetween.

6. A display device according to claim 4, wherein the oxide conductive film is made of ITO.

7. A display device according to claim 1, wherein the signal lines are drain signal lines which supply signal lines to the respective pixels of the display part.

8. A display device according to claim 1, wherein the signal lines are gate signal lines which supply signals to turn on the thin film transistors in supplying the signals to the respective pixels of one group of the display part via the thin film transistor.

9. A display device, wherein
   respective regions of a display part and a terminal part are formed on a surface of a substrate,
   a first insulation film is formed on the display part and the terminal part and a second insulation film is formed on other region except for at least a periphery of the terminal part sequentially,
   first through holes are formed in the display part in a state that the first through holes penetrate the second insulation film and the first insulation film,
   second through holes are formed in the terminal pad in a state that the second through hole which is formed in the first insulation film,
   an angle of side wall surfaces of the second through holes in the first insulation film which is made with respect to the substrate is set smaller than an angle of side wall surfaces of the first through holes in the first insulation film which is made with respect to the substrate, and
   an angle of a side wall surface of an edge of the second insulation film on a terminal part side which is made with respect to the substrate is set smaller than an angle of the side wall surfaces of the first through holes in the second insulation film which is made with respect to the substrate.

10. A display device according to claim 9, wherein the first insulation film is formed of an inorganic material layer and the second insulation film is formed of an organic material layer.

11. A display device according to claim 10, wherein signals are supplied to respective pixels of the display part via thin film transistors, and the first insulation film and the second insulation film are provided to function as a protective film which is formed in a state that the protective film covers the thin film transistors.

12. A display device according to claim 11, wherein in the terminal part, portions of the signal lines which are formed below the first insulation film are exposed via the second through holes formed in the first insulation film, and an oxide conductive film is formed so as to cover at least exposed portions.

13. A display device according to claim 12, wherein the oxide conductive film extends over an upper surface of the first insulation film on peripheries of the second through holes with a portion of the second insulation film interposed therebetween.

14. A display device according to claim 12, wherein the oxide conductive film is made of ITO.

15. A display device according to claim 9, wherein the signal lines are drain signal lines which supply signal lines to the respective pixels of the display part.

16. A display device according to claim 9, wherein the signal lines are gate signal lines which supply signals to turn on the thin film transistors in supplying the signals to the respective pixels of one group of the display part via the thin film transistor.

17. A display device comprising:
    first contact hole formed in a display region and second contact hole formed in a terminal region;
    first insulating layer and second insulating layer formed in that order;
    wherein a taper angle of the first insulating layer at the first contact hole is larger than a taper angle of the first insulating layer at the second contact hole, and
    a taper angle of the second insulating layer at the first contact hole is larger than a taper angle of the second insulating layer around the second contact hole.

18. A display device according to claim 17, wherein the first insulation film is formed of an inorganic material layer and the second insulation film is formed of an organic material layer.

19. A display device according to claim 18, wherein signals are supplied to respective pixels of the display region via thin film transistor, and the first insulation film and the second insulation film are provided to function as a protective film which is formed in a state that the protective film covers the thin film transistor.

20. A display device according to claim 17, wherein in the terminal region, a portion of a signal line which is formed below the first insulation film is exposed via the second contact hole formed in the first insulation film, and an oxide conductive film is formed so as to cover at least an exposed portion.

21. A display device according to claim 20, wherein the oxide conductive film extends over an upper surface of the first insulation film on peripheries of the second contact holes with a portion of the second insulation film interposed therebetween.

* * * * *